United States Patent Office 3,632,545
Patented Jan. 4, 1972

3,632,545
THIXOTROPIC AGENTS FOR LIQUID RESIN SYSTEMS
Charles F. Ferraro, Trenton, N.J., assignor to FMC Corporation, Philadelphia, Pa.
No Drawing. Filed May 13, 1969, Ser. No. 824,302
Int. Cl. C08f 45/50; C08g 51/50
U.S. Cl. 260—30.6 R
6 Claims

ABSTRACT OF THE DISCLOSURE

Pseudoplastic characteristics of organic liquid resin systems containing polymerizable resins, such as solutions of unsaturated polyester resins and polyvinyl plastisols, are improved by incorporating in the liquid resin systems a premixed blend of microcrystalline mineral silicates as thixotropic agents and a polar liquid.

---

This invention relates to organic liquid compositions and, more particularly, to thixotropic resinous compositions comprising a polymerizable unsaturated polyester or a polyvinyl plastisol.

In the use of liquid polymerizable unsaturated polyesters or polyester solutions for the so-called hand lay-up and contact molding applications, an unsaturated alkyd or polyester resin is mixed with or dissolved in a monomer such as styrene and the liquid composition applied to a desired base such as a fiber glass mat. The liquid may be applied by brushing or spraying onto the base or the base may be dipped in the liquid. Polymerization is subsequently effected so as to form a predetermined structure, for example, boat hulls, protective helmets, automobile body parts, etc. One of the troublesome problems encountered in these operations is that the liquid compositions drain from surfaces which are not horizontal and surfaces having vertical components and the structure has a non-uniform distribution of resin. Nonuniform distribution of the resinous substance may result in poor quality or unsatisfactory finished structures.

In order to obviate this difficulty, small amounts of various substances have been incorporated in the liquid compositions so as to impart pseudoplastic or thixotropic properties and to thicken the liquid. Thixotrapic agents used include such inorganic colloidal substances as clays, alkaline earth metal oxides, silica aerogel, pyrogenic silica and microcrystalline mineral silicates such as disclosed in the copending application of Orlando A. Battista. Ser. No. 701,838, filed Jan. 31, 1968, now Pat. No. 3,458,-393 dated July 29, 1969. One of the conventional classes of substances which have been used as bodying or thickening agents is polar liquids including water, polyhydric alcohols, such as, for example, ethylene glycol, diethylene glycol, dipropylene glycol and glycerol, diamines, such as, for example, ethylene diamine, etc. The presence of the polar liquids enhances the thixotropic action of the inorganic thixotropic agents.

Similarly, in the use of polyvinyl plastisol formulations various thixotropic agents are included and their effect may be enhanced by the addition of various polar liquids. For example, a dispersion of a polyvinyl chloride resin in dioctyl phthalate may be thickened and rendered thixotropic by the addition of an inorganic colloidal substance and tricresyl phosphate. The tricresyl phosphate not only enhances the thixotropic action of the agent but also serves as additional plasticizer and increases the flame-retardant properties of the finished product.

One of the purposes of the present invention is to improve substantially the pseudoplastic or thixotropic properties of liquid resinous compositions.

A further purpose of this invention is to simplify the handling of the thixotropic and bodying or thickening agents used to impart pseudoplastic or thixotropic properties to liquid resinous compositions.

Further objects and advantages of this invention will become apparent from the description which follows.

This invention is based upon the discovery that the pseudoplastic or thixotropic properties of liquid resinous compositions are improved substantially by incorporating in the compositions a preformed mixture of a polar liquid and microcrystalline mineral silicates. In conventional practice as illustrated by U.S. Pat. Nos. 2,887,461 and 3,432,458, these substances are added as separate ingredients.

The resinous substance may be prepared by any desired method. Unsaturated polyesters are well known in the art and are prepared by polyesterification of a polyhydric alcohol or a mixture of such alcohols with a polycarboxylic acid or acid anhydride containing $\alpha,\beta$-ethylenic unsaturation or a mixture of such acids. Other polyesters containing $\alpha,\beta$-ethylenic unsaturation may be prepared by polyesterification of polyepoxides with acrylic or methacrylic acid. Typical examples of polyhydric alcohols are ethylene glycol, diethylene glycol, propylene glycol, 1,2-butanediol, 1,4-cyclohexane dimethanol and bisphenol A. Typical examples of polycarboxylic acids are maleic acid, fumaric acid and itaconic acid which may be used per se or in combination with adipic acid, sebacic acid, succinic acid, phthalic acid and isophthalic acid. These specific examples are merely illustrative of the wide range of polyhydric alcohols and polycarboxylic acids which are well known in the art. It is not deemed necessary to include herein a further enumeration of the alcohols and acids and the various methods of preparation of the unsaturated polyesters because these details are well known and form no part of the present invention.

The unsaturated polyester generally is dissolved in or mixed with a liquid $\alpha,\beta$-ethylenic unsaturated copolymerizable monomer such as, for example, styrene, divinyl benzene, methyl methacrylate and vinyl toluene. The amount of monomer may vary from about 10% to 70%, generally being within the range of 20% to 50%, by weight, of the polyester. Customarily, the liquid resinous composition also contains an inhibitor to prevent premature vinyl polymerization. These inhibitors include, for example, hydroquinone, toluhydroquinone and tert-butyl catechol.

The ultimate consumer or user adds a catalyst just prior to utilization of the resinous composition. The catalyst is commonly one which provides free radicals and includes such substances as benzoyl peroxide, methylethyl ketone peroxide, cumene hydroperoxide and 2,2'-azobisisobutyronitrile. The supplier of the resinous composition may or may not include in the composition a promoter which lowers the energy requirements to facilitate the decomposition of the catalyst or initiator and provide the free radicals. Promoters include such compounds as cobalt naphthenate and cobalt octoate.

Polyvinyl plastisols comprise dispersions of vinyl chloride resin particles in a liquid plasticizer. The resin may be a homopolymer of vinyl chloride, such as the high molecular weight polyvinyl chloride resins marketed under the trademarks "Geon 121" by B. F. Goodrich Chemical Co., or "Exon 654" by Firestone Plastic Co., or may be a copolymer of vinyl chloride with vinyl acetate, vinylidene chloride, acrylonitrile or ethyl maleate. The plasticizer may be dioctyl phthalate, butyl decylphthalate, dicapryl phthalate, didecyl phthalate, butyl benzyl phthalate, cresyl diphenyl phthalate, dioctyl adipate, dipropylene glycol dibenzoate, tricresyl phosphate, trioctyl phosphate, acetyl tributyl citrate, epoxy-type plasticizers such as "Monoplex G-50" and "Paraplex C-62" of Rohm and Haas Co. and butadiene acrylonitrile copolymers such as "Hycar 1312" of B. F. Goodrich Chemical Co. It is common practice to employ two or more plasticizers and the plasticizers employed may be selected to provide desired viscosity characteristics and desired properties in the finished products. For example, tricresyl phosphate may be included to improve the products' flame-retardant characteristics. These plastisols generally include heat and light stabilizers which include compounds or complexes of barium, cadium, lead, tin and zinc. In general, the stabilizers are liquid phosphites which are soluble in the plasticizer. The function of the heat stabilizer is to prevent thermal decomposition or depolymerization of the resin particularly during the heating stages required for gelation and curing. Fillers such as calcium carbonate, talc and hydrous magnesium silicate and pigments may also be included.

Thixotropic agents as described in the brief discussion of liquid unsaturated polyester compositions and soaps are satisfactory for imparting psuedoplastic properties to the plastisols. Here again, the presence of polar liquids enhances the action of the thixotropic agents. It is not deemed necessary to describe further the details of the methods for producing the vinyl type resins for use in plastisols and the wide variety of plastisol constituents because these matters form no part of the present invention and are well known.

In adding the thixotropic agent and the bodying or thickening agent in the foregoing types or classes of organic liquid resinous compositions, the agents are added independently of each other. As is well known, the addition of a colloidal inorganic thixotropic agent increases the viscosity and improves the pseudoplastic characteristics of the resin-containing liquids. The presence of a polar substance enhances the viscosity and the pseudoplastic characteristics. In general, the presence of or the addition of a promoter lowers the effect or efficiency of the thixotropic agent.

One of the commonly used thixotropic agents is pyrogenic silica. One of its distinguishing characteristics is the relatively small decrease in the pseudoplastic properties of liquid polyester compositions containing a promoter such as cobalt naphthenate when the thixotropic agent, polar liquid and promoter are added independently and in the conventional manner. However, when the pyrogenic silica is mixed or blended with the polar liquid before adding these ingredients to the resin-containing liquid which includes a promoter, an excessive decrease in the pseudoplastic properties is noted. From an operating viewpoint, the blended material obviates difficulties of handling the powdery pyrogenic silica which has a bulk density of about 2.3 lbs./cu. ft. as compared to a blend of 1 part by weight with 2 parts by weight of diethylene glycol which has a bulk density of about 20 lbs./cu. ft.

The action of the pyrogenic silica and diethylene glycol in a commercial polyeter resin composition in the absence of and in the presence of a promoter is illustrated by the following example wherein the polyester resin composition was a commercial composition containing a styrene modified polyester resin dissolved in styrene (specifically "Laminac 4123" of American Cyanamid Co.) diluted with styrene to a 52% solids concentration.

EXAMPLE 1

In preparing Sample A, about 400 gms. of the resin solution ("Laminac 4123") was charged to a Waring Blendor jar. Approximately 4 gms. of pyrogenic silica ("Cab-O-Sil M5" of Cabot Corporation) and 4 gms. of diethylene glycol were added independently and thoroughly mixed into the solution by operating the Waring Blendor for 3 minutes at low speed. In Sample B, 1.20 gms. of a cobalt naphthenate promoter (Cobalt "C"—12% cobalt naphthenate) was included in the formulation. In preparing Sample C, the pyrogenic silica and diethylene glycol were blended together prior to addition to the "Laminac 4123" and 1.20 cobalt "C" was added independently.

After the mixing period, the samples were cooled to 25° C. and the Brookfield viscosities measured at spindle rotations of 1, 2.5 and 20 r.p.m. using a Brookfield viscometer, Model RVT and disc spindles. The average viscosities of 5 determinations at each speed of rotation were as follows:

TABLE 1

| Sample: | Viscosity, poises | | |
| --- | --- | --- | --- |
| | 1 r.p.m. | 2.5 r.p.m. | 20 r.p.m. |
| A | 50.9 | 25.0 | 7.8 |
| B | 46.7 | 22.9 | 7.1 |
| C | 29.5 | 15.2 | 4.7 |

In accordance with the present invention wherein the thixotropic agent and the polar liquid are premixed, a substantial increase in the viscosity is obtained as compared to adding the two constituents independently. Although the blending of the thixotropic agent and polar liquid does not avoid a lowering of the viscosity in the presence of the usual promoter, the decrease in viscosity is from a substantially higher initial viscosity so that the final viscosity remains within tolerable limits.

The microcrystalline mineral silicates used as thixotropic agents are prepared by the method described in the copending application of Orlando A. Battista, Ser. No. 701,838, filed Jan. 31, 1968, now U.S. Pat. No. 3,458,393. In accordance with this method, chrysotile is treated with an acidic solution so as to increase the $SiO_2$ to MgO weight ratio from about 5% to about 30% as compared to the original weight ratio of about 1:1. This chemical modification may be controlled by varying the hydrogen ion concentration, the temperature, the time and the pressure of treatment. For example, the chrysotile may be treated in a 0.2 N hydrochloric acid solution at 5% solids content for from ½ to 4 hours under reflux conditions. This treatment produces an optimum increase in the $SiO_2$ to MgO weight ratio of about 20%. Other mineral acids and combinations of acids may be substituted for the hydrochloric acid. The chemically modified chrysotile is then subjected to mechanical disintegration or an attrition treatement until at least 5% by weight has been reduced to a particle size not exceeding 1 micron. This product forms stable thixotropic dispersoids in water and other polar liquids. The microcrystalline mineral silicates are defined as disintegrated chemically modified chrysotile at least about 5% by weight having a particle size not exceeding 1 micron and having a $SiO_2$ to MgO weight ratio from about 5% to 30% greater than the corresponding weight ratio of the parent chrysotile.

The thickening or bodying liquids contain such polar groups as —OH, =O, —O—, —$NH_2$ and =NH and include, for example, water, lower aliphatic alcohols such as ethanol, propanol, isopropanol, etc., polyhydric alcohols such as ethylene glycol, diethylene glycol, propylene glycol, dipropylene glycol, glycerol, pentaerythritol, etc., dioctyl phthalate, tricresyl phosphate, amines such as lower aliphatic amines, for example, ethyl amine, propyl amine, etc., polyamines such as ethylene diamine, diethylene triamine, etc., ketones such as acetone, methylisobutylketone, etc., ethers such as the low molecular weight polyethylene oxides, etc. Other polar liquids have been set forth hereinabove in the discussion of both polyester solutions and the vinyl plastisols.

The microcrystalline mineral silicate and polar liquid are intimately and thoroughly mixed or blended in a wide range of weight ratios, in most instances, the weight ratio will be from 1 part by weight of the mineral silicate to 2 parts of the polar liquid to about 2 parts of the mineral silicate and 1 part of the polar liquid. In general, these ratios provide optimum thixotropic or pseudoplastic characteristics to the liquid resins.

Any suitable means for thoroughly mixing or blending the finely divided solid and liquid is satisfactory. Satisfactory mixers or blenders include conventional cone or double cone blenders such as manufactured by Komline-Sanderson Engineering Corportaion and Patterson-Kelley Co., Inc. These blenders consist of opposed conical chambers positioned in a base-to-base relationship and rotated on an axis passing through the bases and at a right angle to the axis of the conical chambers. Also satisfactory are the conventional twin-shell blenders consisting of cylindrical chambers positioned at 90° to each other to form a V-shaped or W-shaped configuration and rotated on a horizontal axis such as the Patterson-Kelley twin-shell blenders marketed by Patterson-Kelley Co., Inc. These blenders are provided with an intensifier bar consisting of a tube positioned internally of the chambers through which the liquid may be introduced. The intensifier bar is provided with radially extending pins or spikes and is mounted coaxially with the axis of rotation of the chambers but rotatably independently of the chambers. In operation, the intensifier bar is rotated at an appreciably higher speed than the chambers and aids in intimately blending the solid and liquid as they fall through space within the chambers. Obviously, other mixers such as sigma-blade mixers, planetary mixers, etc. are also satisfactory.

One of the particular advantages in the use of a blend of the thixotropic agent and polar liquid is that it avoids the use of the low bulk density thixotropic agent by itself which is generally in a powdered state and results in a dust problem. The blend is non-dusting and has a high density. For example, a commercial grade of microcrystalline mineral silicate marketed under the trademark "Avibest" has a bulk density of about 6 lbs. per cu. ft. whereas a preformed mixture of 1 part by weight of the mineral silicate and 1.5 to 2.0 parts of diethylene glycol has a bulk density of about 37.4 lbs. per cu. ft. Obviously, the higher bulk density product simplifies storage and ease of handling of the two ingredients and permits an accurate measurement of the quantity of the materials. Normally, when the polar liquid and thixotropic agent are added as separate ingredients, the polar liquid may be mixed into the liquid resin with relatively mild agitation. The thixotropic agent requires an intense agitation, as in a Cowles dissolver, so as to thoroughly and intimately disperse the solid particles throughout the liquid. Thus, two separate weighings and mixing operations are required. In the use of the blended materials, a single weighing and mixing is required thereby simplifying the handling of the ingredients and lowering substantially the time required for adding the materials and thoroughly mixing them into the liquid resin compositions.

From the functional standpoint, incorporation of the blended materials effects an appreciably higher viscosity of the liquid resin compositions than can be obtained by the addition of the same quantities or proportions of the ingredients when added independently. Furthermore, the reduction in viscosity in the presence of the usual promoters is not so great as to lower the viscosity to an unsatisfactory value.

As an illustration of the invention, a blend of 1 part of the microcrystalline mineral silicate and 2 parts of commercial grade diethylene glycol were thoroughly and intimately mixed in a twin-shell blender, specifically a Patterson-Kelley blender, Model LB 2628. The mineral silicate was charged into the blender and the diethylene glycol added through the intensifier bar over a period of 15 minutes. The twin-shell blender was rotated at 60 r.p.m. and the intensifier bar at 3000 r.p.m. At the completion of the addition of the diethylene glycol, the material adhering to the walls of the shell was scraped from the walls and the shell then operated for an additional 5 minutes. The blended product was a free-flowing granular type of product.

Portions of the blended product were dispersed in a variety of commercially available polyester resin liquid compositions. In each instance, a 400-gram sample of the liquid resin system was introduced into a 1 quart high speed mixer specifically a Waring Blendor, Model D1003 base. To one sample, 0.25% microcrystalline mineral silicate and 0.50% diethylene glycol were added independently. In another sample, 0.75% of the blend was added. In the case of the liquid resin systems containing no promoter, duplicate samples were run after the addition of cobalt naphthenate (6% metal content, Advance Div. Carlisle Chemical Works). In those instances where the separate ingredients were added to the resin liquid, the polar liquid and the cobalt solution were stirred manually in the jar and the blender operated upon addition of the mineral silicate. In all instances, the blender after addition of all ingredients was operated for 3.0 minutes at low speed. All resin solutions contained about 52% by weight of the resin in styrene.

The viscosity of all liquids was measured by the use of a Brookfield Viscometer Model RVT and a set of disc spindles. The temperature at the time of measurements was 25°±1° C. and viscosities in poise were calculated for rotations of 1, 2.5 and 20 r.p.m.

EXAMPLE 2.—STYRENE-MODIFIED POLYESTER IN STYRENE, UNPROMOTED

American Cyanamid Co.—Laminac 4123

| Wt. percent in polyester | | | Weight percent added promoter | Viscosity | | |
|---|---|---|---|---|---|---|
| MCS | Glycol | MCS plus glycol | | 1 r.p.m. | 2.5 r.p.m. | 20 r.p.m. |
| 0 | 0 | 0 | 0 | 1.0 | 1.0 | 1.0 |
| 0.25 | 0.50 | | 0 | 83 | 38 | 11 |
| | | 0.75 | 0 | 158 | 69 | 16 |
| 0.25 | 0.50 | | 0.30 | 43 | 20 | 5 |
| | | 0.75 | 0.30 | 70 (¹66) | 31 (¹30) | 8 (¹8) |

¹ Viscosity at end of 6 weeks storage.

EXAMPLE 3.—MALEIC ANHYDRIDE-ETHYLENE GLYCOL-PROPYLENE GLYCOL POLYESTER IN STYRENE 28C-8A Marco Chemical Division, W. R. Grace Co.

| Wt. percent in polyester | | | Weight percent added promoter | Viscosity | | |
|---|---|---|---|---|---|---|
| MCS | Glycol | MCS plus glycol | | 1 r.p.m. | 2.5 r.p.m. | 20 r.p.m. |
| 0 | 0 | 0 | 0 | 2.0 | 2.0 | 2.0 |
| 0.25 | 0.50 | | 0 | 142 | 67 | 17 |
| | | 0.75 | 0 | 240 | 109 | 27 |
| 0.25 | 0.50 | | 0.30 | 58 | 30 | 9 |
| | | 0.75 | 0.30 | 107 | 51 | 13 |

EXAMPLE 4

Polyester-Uceflex ME-70, Unique Chemique Belge, Belgium

| Wt. percent in polyester | | | Weight percent added promoter | Viscosity | | |
|---|---|---|---|---|---|---|
| MCS | Glycol | MCS plus glycol | | 1 r.p.m. | 2.5 r.p.m. | 20 r.p.m. |
| 0 | 0 | 0 | 0 | 22 | 22 | 22 |
| 0.25 | 0 | | 0 | 32 | 30 | 29 |
| 0.25 | 0 | | 0.50 | 31 | 30 | 27 |
| | | 0.75 | 0 | 177 | 112 | 41 |
| | | 0.75 | 0.50 | 52 | 44 | 27 |

EXAMPLE 5.—ALKYD POLYESTER IN STYRENE

Laminac 4155, American Cyanamid Co.

| Wt. percent in polyester | | | Weight percent added promoter | Viscosity | | |
|---|---|---|---|---|---|---|
| MCS | Glycol | MCS plus glycol | | 1 r.p.m. | 2.5 r.p.m. | 20 r.p.m. |
| 0.25 | 0.50 | | | 79 | 35 | 9 |
| | | 0.75 | | 137 | 62 | 15 |
| 0.25 | 0.50 | | 0.30 | 30 | 17 | 4 |
| | | 0.75 | 0.30 | 69 | 31 | 8 |

In the following examples, the resin compositions are supplied by the manufacturer containing a promoter, present in about 0.30%.

EXAMPLE 6.—STYRENE-MODIFIED POLYESTER IN STYRENE

Stypol resin 40-2323, Freeman Chemical Co. (promoted)

| Wt. percent in polyester | | | Weight per- cent added promoter | Viscosity | | |
|---|---|---|---|---|---|---|
| MCS | Gly- col | MCS plus glycol | | 1 r.p.m. | 2.5 r.p.m. | 20 r.p.m. |
| 0 | 0 | 0 | | 3.5 | 3.5 | 3.5 |
| 0.25 | 0 | | | 14 | 12 | 6 |
| 0.25 | 0.50 | | | 20 | 15 | 6 |
| | | 0.75 | | 96 | 47 | 12 |

EXAMPLE 7

LS-5713, Allied Chemical Co. (promoted)

| Wt. percent in polyester | | | Weight per- cent added promoter | Viscosity | | |
|---|---|---|---|---|---|---|
| MCS | Gly- col | MCS plus glycol | | 1 r.p.m. | 2.5 r.p.m. | 20 r.p.m. |
| 0 | 0 | 0 | | 1.5 | 1.5 | 1.5 |
| 0.25 | 0 | | | 21 | 12 | 4 |
| 0.25 | 0.50 | | | 53 | 25 | 7 |
| | | 0.75 | | 101 | 49 | 12 |

As clearly illustrated by the foregoing examples, the addition of the blend of microcrystalline mineral silicate (MCS) and polar liquid effects a very substantial increase in the pseudoplastic properties of the liquid resin systems as compared to the addition of the same proportions of the individual substances. In many instances, the use of the blend results in at least about a doubling of the viscosities in the presence of the metal containing promoters.

Similar results are effected in the polyvinyl plastisols. The following example is representative of the effects resulting from the use of a blend of the microcrystalline mineral silicate and polar liquid.

EXAMPLE 8

The same procedure as described above was utilized in preparing a blend of 1 part by weight of microcrystalline mineral silicate (MCS) and 2 parts by weight of tricresyl phosphate (TCP). 1.5% by weight of the blend was introduced into a 400 gram sample of dioctyl phthalate (DOP), one of the common plastisol plasticizers. The same proportions of MCS and TCP were added independently to another sample. After measuring the viscosities of the two batches, a conventional barium-cadmium complex stabilizer ("Advastab BC-100") was added in an amount of 0.75% by weight to each batch and the viscosity measured. The viscosities were as follows; measurements were made as described hereinbefore.

| Wt. percent in DOP | | | Wt. percent Ba-Cd complex | Viscosity | | |
|---|---|---|---|---|---|---|
| MCS | TCP | MCS plus TCP | | 1 r.p.m. | 2.5 r.p.m. | 20 r.p.m. |
| 0.50 | 1.00 | | 0 | 144 | 62 | 17 |
| | | 1.50 | 0 | 177 | 83 | 35 |
| 0.50 | 1.00 | | 0.75 | 47 | 24 | 6 |
| | | 1.50 | 0.75 | 97 | 46 | 11 |

The foregoing examples are representative and like effects are obtained by substituting other polar liquids for the diethylene glycol and tricresyl phosphate. The presence of a polyvinyl resin in dioctyl phosphate has no effect on the improvements in pseudoplastic properties as illustrated in Example 8.

As illustrated by the foregoing examples, the improvements in the pseudoplastic properties of the liquid resin compositions are obtained only where the thixotropic agent consists of microcrystalline mineral silicates blended with a polar liquid. Blends of other conventional thixotropic agents with polar liquids do not effect the improvements realized by the method of this invention.

In the foregoing examples, the specific microcrystalline mineral silicate was prepared by treatment of chrysotile with 0.4 N hydrochloric acid solution at 10% by weight solids concentration at reflux temperature for about ½ hour so as to increase the $SiO_2$ to $MgO$ weight ratio about 20% (a weight ratio of 1.20:1) from the original ratio of approximately 0.99:1. Although this increase in the weight ratio appears to be optimum for the purposes of the invention, microcrystalline mineral silicates as described hereinbefore having $SiO_2$ to $MgO$ weight ratios from about 5% to about 30% greater than the original weight ratio of the parent chrysotile are satisfactory.

I claim:

1. The method of improving the pseudoplastic properties of liquid resinous compositions of the class consisting of organic liquid solutions of unsaturated polyester resins and liquid polyvinyl plastisols which comprises adding to and intimately mixing with the liquid resinous composition a blend of chemically modified chrysotile having a $SiO_2:MgO$ weight ratio of from about 5% to about 30% greater than the corresponding ratio of the parent chrysotile and a polar liquid, the weight ratio of the chemically modified chrysotile to the polar liquid of the blend being from about 1:2 to about 2:1.

2. The method as defined in claim 1 wherein the chemically modified chrysotile has a $SiO_2:MgO$ weight ratio of 1.20:1.

3. The method as defined in claim 1 wherein the liquid resinous composition is a styrene solution of an unsaturated polyester resin.

4. The method as defined in claim 1 wherein the liquid resinous composition is a styrene solution of an unsaturated polyester resin and the polar liquid is diethylene glycol.

5. The method as defined in claim 1 wherein the liquid resinous composition is a polyvinyl plastisol comprising a dispersion of a polyvinyl resin in dioctyl phthalate.

6. The method as defined in claim 1 wherein the liquid resinous composition is a polyvinyl plastisol comprising a dispersion of a polyvinyl resin in dioctyl phthalate and the polar liquid is tricresyl phosphate.

References Cited

UNITED STATES PATENTS

| 2,887,461 | 5/1959 | Hort | 260—40 |
| 3,077,424 | 2/1963 | Maker et al. | 260—40 X |
| 3,133,884 | 5/1964 | Graham et al. | 260—30.6 X |
| 3,432,458 | 3/1969 | Kwan et al. | 260—33.4 |

LEWIS T. JACOBS, Primary Examiner

U.S. Cl. X.R.

260—31.8 R, 40 R, 41 A

UNITED STATES PATENT OFFICE
CERTIFICATE OF CORRECTION

Patent No. 3,632,545   Dated January 4, 1972

Inventor(s) Charles F. Ferraro

It is certified that error appears in the above-identified patent and that said Letters Patent are hereby corrected as shown below:

Column 7, lines 60 & 61 "the improvements in pseudoplastic properties as illustrated of a polyvinyl resin in dioctyl phosphate has no effect on" should read --of a polyvinyl resin in dioctyl phosphate has no effect on the improvements in pseudoplastic properties as illustrated--.

Signed and sealed this 22nd day of May 1973.

(SEAL)
Attest:

EDWARD M. FLETCHER, JR.
Attesting Officer

ROBERT GOTTSCHALK
Commissioner of Patents